No. 628,459. Patented July 11, 1899.
R. GOLL.
MEANS FOR REGULATING FLUID CURRENTS IN CONDUITS, PIPES, &c.
(Application filed Dec. 29, 1897.)
(No Model.) 2 Sheets—Sheet 1.
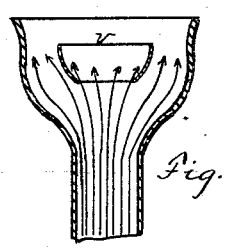
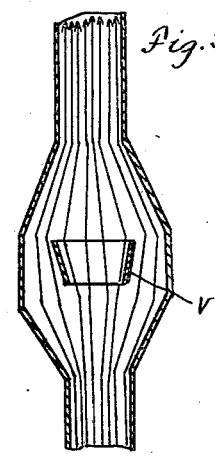
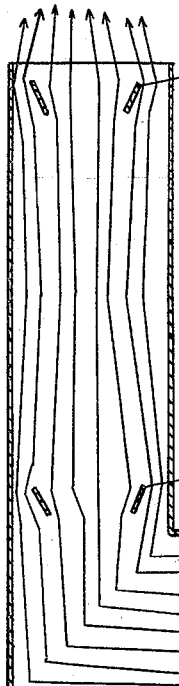
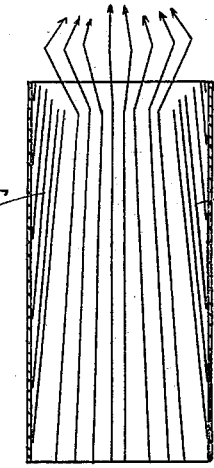
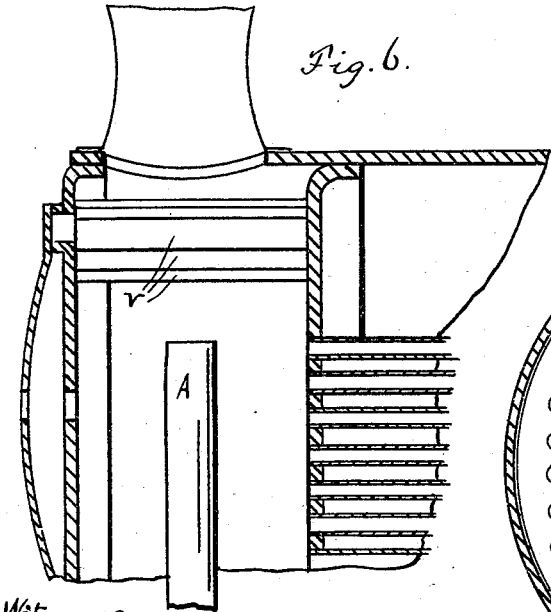
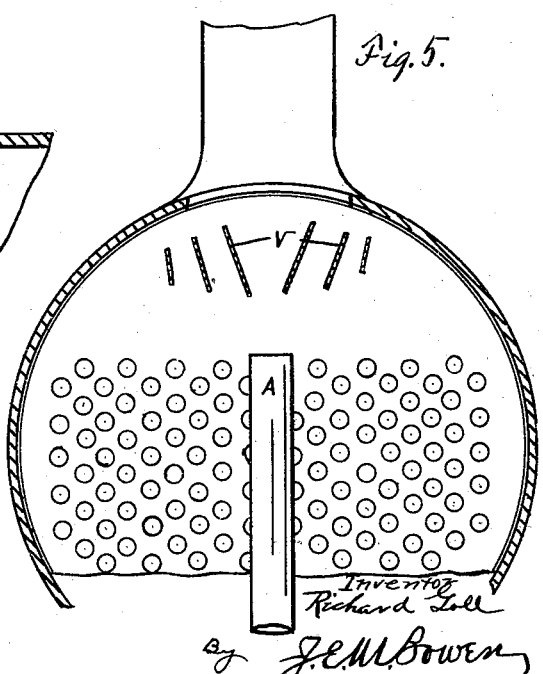
Witnesses
H. L. Gould
D. W. Gould
Inventor
Richard Goll
by J.E.M.Bowen
Attorney

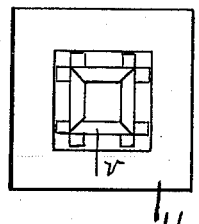
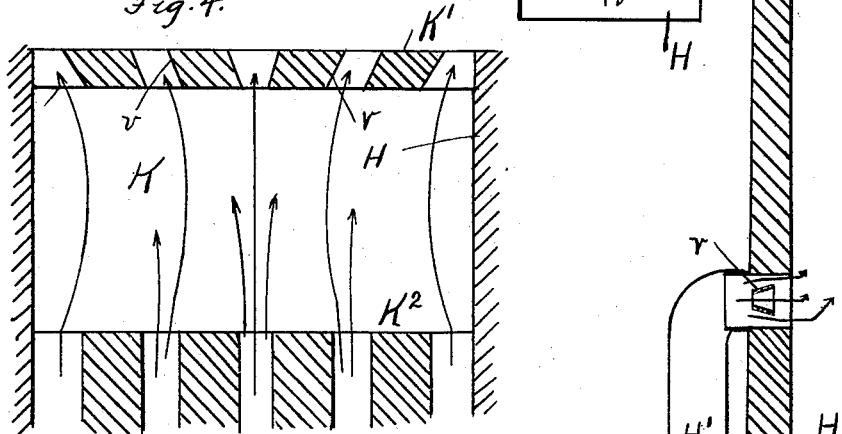
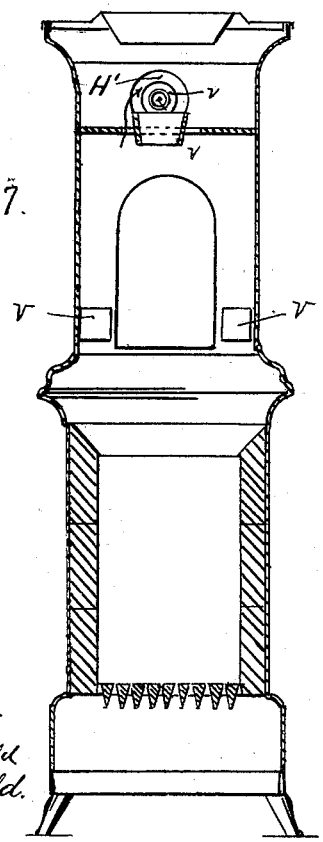
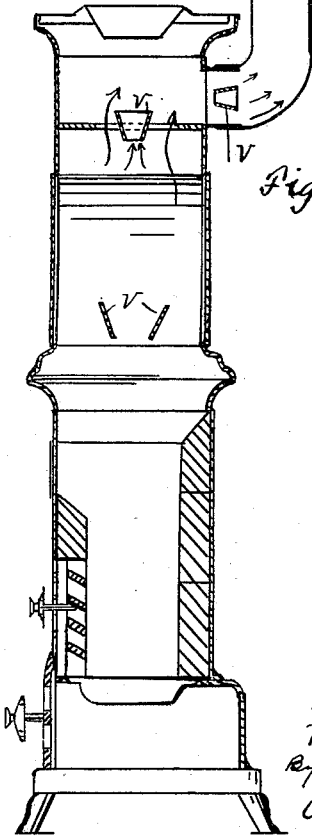

UNITED STATES PATENT OFFICE.

RICHARD GOLL, OF FRANKFORT-ON-THE-MAIN, GERMANY.

MEANS FOR REGULATING FLUID-CURRENTS IN CONDUITS, PIPES, &c.

SPECIFICATION forming part of Letters Patent No. 628,459, dated July 11, 1899.

Application filed December 29, 1897. Serial No. 664,359. (No model.)

*To all whom it may concern:*

Be it known that I, RICHARD GOLL, manufacturer, residing at Frankfort-on-the-Main, in the Kingdom of Prussia, German Empire, have invented new and useful Improvements in Means for Regulating Fluid-Currents in Conduits, Pipes, Channels, and the Like, (patented in Germany, No. 88,410, April 17, 1894, and No. 90,744, April 27, 1896; in Austria, No. 47/1,813, August 24, 1896; in Switzerland, No. 14,046, August 22, 1896; in Hungary, No. 8,485, August 28, 1896; in Italy, No. 83/462, September 27, 1896; in England, No. 17,687, August 10, 1896; in France, No. 255,851, April 25, 1896; in Spain, No. 19,737, October, 1896; in Belgium, No. 121,816, June 8, 1896, and in Luxemburg, No. 2,687, December 3, 1896,) of which the following is a specification.

This invention has for its object to so regulate the flow of liquids and gases in conduits, pipes, channels, and the like that the flow will be uniform and unobstructed and will also have a reactive effect—such, for example, in the case of fireplaces, &c., where the effect will be to insure a regular and, as far as possible, smokeless combustion. The friction of the fluid, whether air, gas, or liquid, flowing along the walls of the conduit acts to retard the movement of the layer of fluid nearest to the walls which lags behind and in turn reacts on the adjacent layer, and so on, and since the influence of the friction thus acts proportionally to the length of flow in the conduit this friction has a wedge-like effect, producing a deflection of the current. This deflection produces in the center of the current a compression of the flowing particles which reacts outward, and in consequence of the compensating movements that take place at intervals along the line of flow produces swirling or whirling movements in the conduits, particularly in chimneys.

Figure 1 of the accompanying drawings illustrates diagrammatically how compression of the more active or rapid current is produced by the more sluggish outer layer, indicated by the lines which gradually increase toward the interior the longer the flow. Figs. 2, 3, and 3ª are diagrammatic views of different forms of my apparatus. Figs. 5 and 6 are partial end and sectional views, respectively, showing the invention embodied in a locomotive. Fig. 4 shows one form of my device in a chimney. Fig. 7 is a central vertical section of a stove. Fig. 8 is a section at right angles to Fig. 7, but showing also a stovepipe and chimney; and Fig. 9 shows a plan of the chimney.

I have observed that by inserting suitable obliquely-set guiding or distributing vanes in the path of the current not only the course of the current between these vanes is directly influenced, but also that such obliquely-set vanes produce a reaction upon the course of the current by equalizing the same for relatively large distances. By arranging a series of guiding or deflecting devices at determined distances the current can be so influenced and equalized throughout the whole length of the conduit. The current can be assumed to be divided into a number of streams, and the object in view is to guide these several streams as far as possible parallel to one another and to obviate retardation along the walls of the conduit by deflecting those streams which are situated in the center and which flow with greater velocity away from that situation and toward the sides. Fig. 2 illustrates the most simple way of carrying out this mode of regulation, the direction of flow indicated by the lines in this figure being produced and maintained by means of obliquely-set plates $v$ in the path of the current. Figs. 3 and 3ª show how these distributing-vanes $v$ may be arranged in enlarged parts of the conduit, said enlarged portions being interposed in conduits of small cross-sectional area or connected thereto for the purpose of enabling the current in said conduits to be regulated by such vanes. In using regulating devices of this kind the main object will generally be to effect uniformity of flow in the conduit, and particularly in the case of fireplaces and furnaces, without, however, excluding other kinds of guidance in particular cases. This regulation can be effected in accordance with the foregoing and also by influencing the escaping volumes—such as, for instance, in fireplaces—by means of devices arranged above the grate or in the smoke-flues or heating-flues and in the chimney. When, for instance, the escaping gases encounter above the grate a greater resistance at one point than at another, this will cause a reaction, having for result to produce a weaker inflow of air at that point. One form of construction adapted to produce this action is shown in Fig. 4, and consists in making the guide-vanes $v$ the solid portions of apertured diaphragms $K'$ $K^2$, fixed across the passage or conduit, the apertures in the "exit-diaphragm" of the intermediate chamber K of chimney H being so arranged as to provide passages of flow in the middle of the chamber which diverge or become wider toward the outside, and inversely become more and more contracted at the sides of the chamber toward the outside. The effect of this is to contract the central opening in diaphragm $K'$, where the draft is naturally strongest, and to enlarge the side openings, and at the same time to provide the deflecting surfaces or vanes $v$ for improving the circulation, as hereinbefore described. The diaphragm $K^2$ below $K'$ in the chimney also has openings of increasing size from the central opening to the outer openings. The walls of these openings are preferably vertical and not inclined like those in diaphragm $K'$. While it is preferred to use both disks, the utility of disk $K'$ is not dependent on disk $K^2$. The volumes of air having a special tendency to flow toward the center of the chimney are compelled to spread out in their passage through this middle area, and their velocity of flow is therefore diminished, while the excess of volume which would otherwise occur within the chamber toward the center is diverted or deflected toward the sides, where it meets passages of uniformly-extending area. These are unable to take up the excess of volume coming to them from the center without in turn giving up a portion toward the sides, where in the upwardly-contracting passages it helps to force on the otherwise sluggish flow in an upward direction and flows off with the latter. Consequently the current at the "inflow-diaphragm," which is assumed to be completely equalized, is kept uniform throughout its course through the chamber by reason of the weakening of the otherwise stronger current in the center and by reason of the strengthening of the otherwise weaker current at the sides. Consequently, in general, the arrangement of fixed or movable vanes above the grate or below the grate or at a suitable distance from the grate will enable the several different divided and guided products of combustion to have the required reaction upon the current flowing through the grate. The regulating devices placed in the path of the escaping gases at the proper angle in each particular case will thus act first by stemming and diverting the flow at the surface of the burning layer and further upon the proper influx of air from below, while at the same time the retardation of flow acts upon the paths of the several air-currents coming from the burning fuel in such a manner as to produce a distribution of the gases favorable to the giving off of heat. The action of the fixed or movable guide-vanes $v$ may be further increased by causing them to take up or receive the exhaust from a steam-engine, the regulation of which exhaust produces a regulation of the air carried along by it, so that then the air can be said to be sucked or drawn in with more or less intensity in the different parts of the cross-sectional area of flow. Figs. 5 and 6 illustrate an example of the application of this invention to a locomotive, the vanes $v$ being placed in the smoke-box between the blast-pipe A and the chimney, so as to be acted upon by the exhaust-steam and thereby regulate the draft, the vanes being arranged obliquely across the smoke-box from front to back above the mouth of the blast-pipe in such a position as to divide the path of the steam and hot gases into unequally-divergent passages—that is to say, the central passage becomes wider, while the side passages become contracted toward the top to a degree increasing with their distance from the center. The result of this arrangement is to render the passage of the products of combustion and also of the steam more difficult in the middle and less in amount, while the passage is rendered easier toward the sides, and also the action of the exhaust-steam upon the draft is partially transferred from the center. It will be seen that by means of this arrangement the escape of the products of combustion from the laterally-situated boiler-tubes is facilitated by reason of the greater cross-sectional area formed at said places between the vanes, while it is aided by the greater amount of steam which exhausts through these passages than before and which is greater than that passing along the center. In consequence there is produced a more active flow of the gases at the sides above the grate, with a consequently more active inflow of air than before, whereby the desired regulating action is effected.

The application of the vanes to a closed stove is illustrated in Figs. 7, 8, 9, and $9^a$, the vanes $v$ being placed in the flues above the combustion-space, the vanes being formed by transversely-extending bars, which serve to prevent the premature burning away of the central part of the coals and the formation of a channel through the center of the layer of coals, as usually happens in an ordinary surface burning furnace or stove. This is prevented by the central draft being partially stemmed and deflected, with the result that the air is caused to pass through at the sides of the layer of coals, so as to produce uniform combustion.

In order to maintain the uniformity of draft, suitable guide-vanes are arranged at intervals along the whole extent of the flue $H'$ and up to the top of the chimney H, said vanes serving to counteract the tendency of rapid combustion in the center.

Now what I claim, and desire to secure by Letters Patent, is the following:

1. The combination with a conduit for fluids, and in which fluid-currents are designed to flow in a predetermined direction, of current-equalizing vanes placed obliquely in the conduit and diverging in the direction in which said current flows, said vanes forming a passage centrally in the conduit and also side passages in the conduit.

2. The combination with a conduit, adapted to conduct fluid-currents such as products of combustion, of a combustion-chamber connected with said conduit, and oblique vanes $v$ in the path of such currents, as described.

3. The combination with a conduit having an enlargement therein, of current-equalizing vanes $v$ in said enlargement, said vanes diverging in the direction of the current flow, as described.

In testimony whereof I have signed my name to this specification in the presence of two subscribing witnesses.

RICHARD GOLL.

Witnesses:
DEAN B. MASON,
FRANK H. MASON.